US007181502B2

(12) United States Patent
Incertis

(10) Patent No.: US 7,181,502 B2
(45) Date of Patent: *Feb. 20, 2007

(54) SYSTEM AND METHOD FOR LOCATING ON ELECTRONIC DOCUMENTS ITEMS REFERENCED IN A PHYSICAL DOCUMENT

(75) Inventor: Fernando Carro Incertis, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 775 days.

This patent is subject to a terminal disclaimer.

(21) Appl. No.: 10/295,683

(22) Filed: Nov. 15, 2002

(65) Prior Publication Data

US 2003/0191852 A1 Oct. 9, 2003

(30) Foreign Application Priority Data

Mar. 21, 2002 (EP) .................................. 02368026

(51) Int. Cl.
*G06F 15/16* (2006.01)
(52) U.S. Cl. ...................... 709/217; 709/203; 709/218; 345/156; 345/173; 345/163; 715/702
(58) Field of Classification Search ........ 709/217–218, 709/203; 345/156, 173, 163; 715/702
See application file for complete search history.

(56) References Cited

U.S. PATENT DOCUMENTS 4,855,725 A * 8/1989 Fernandez ................. 345/173
5,572,643 A * 11/1996 Judson ...................... 709/218
5,990,869 A * 11/1999 Kubica et al. ............. 345/163
6,035,330 A * 3/2000 Astiz et al. ................ 709/218
6,256,638 B1 * 7/2001 Dougherty et al. ...... 707/104.1
6,353,850 B1 * 3/2002 Wies et al. ................ 709/203
6,429,846 B2 * 8/2002 Rosenberg et al. ........ 345/156
6,587,859 B2 * 7/2003 Dougherty et al. ...... 707/104.1
6,674,425 B1 * 1/2004 Louis et al. ................ 345/173
6,771,283 B2 * 8/2004 Carro ........................ 715/702
6,904,570 B2 * 6/2005 Foote et al. ................ 715/863
6,940,491 B2 * 9/2005 Incertis Carro ............. 345/173

* cited by examiner

*Primary Examiner*—John Follansbee
*Assistant Examiner*—Saket Daftuar
(74) *Attorney, Agent, or Firm*—Rissman Jobse Hendricks & Oliverio, LLP

(57) ABSTRACT

The present invention generally relates to interactive hypermedia systems for locating electronic documents referenced on physical documents. More particularly, the present invention discloses a method and system for creating hyperlinks from one or more items, e.g. words, pictures, foot notes, symbols, icons, on a physical document to electronic documents and for activating the hyperlink in response to touching the selected item on the physical document. Also disclosed is a method and system for accessing, retrieving and displaying the hyperlinked electronic document and for pointing to the position (or positions) of the selected item on the displayed electronic document. In one embodiment, the invention discloses a method and system for locating on digital images, e.g., digital maps, the positions of items, e.g., locations names, referenced in a hard-copy document.

24 Claims, 12 Drawing Sheets

Main components of the invention

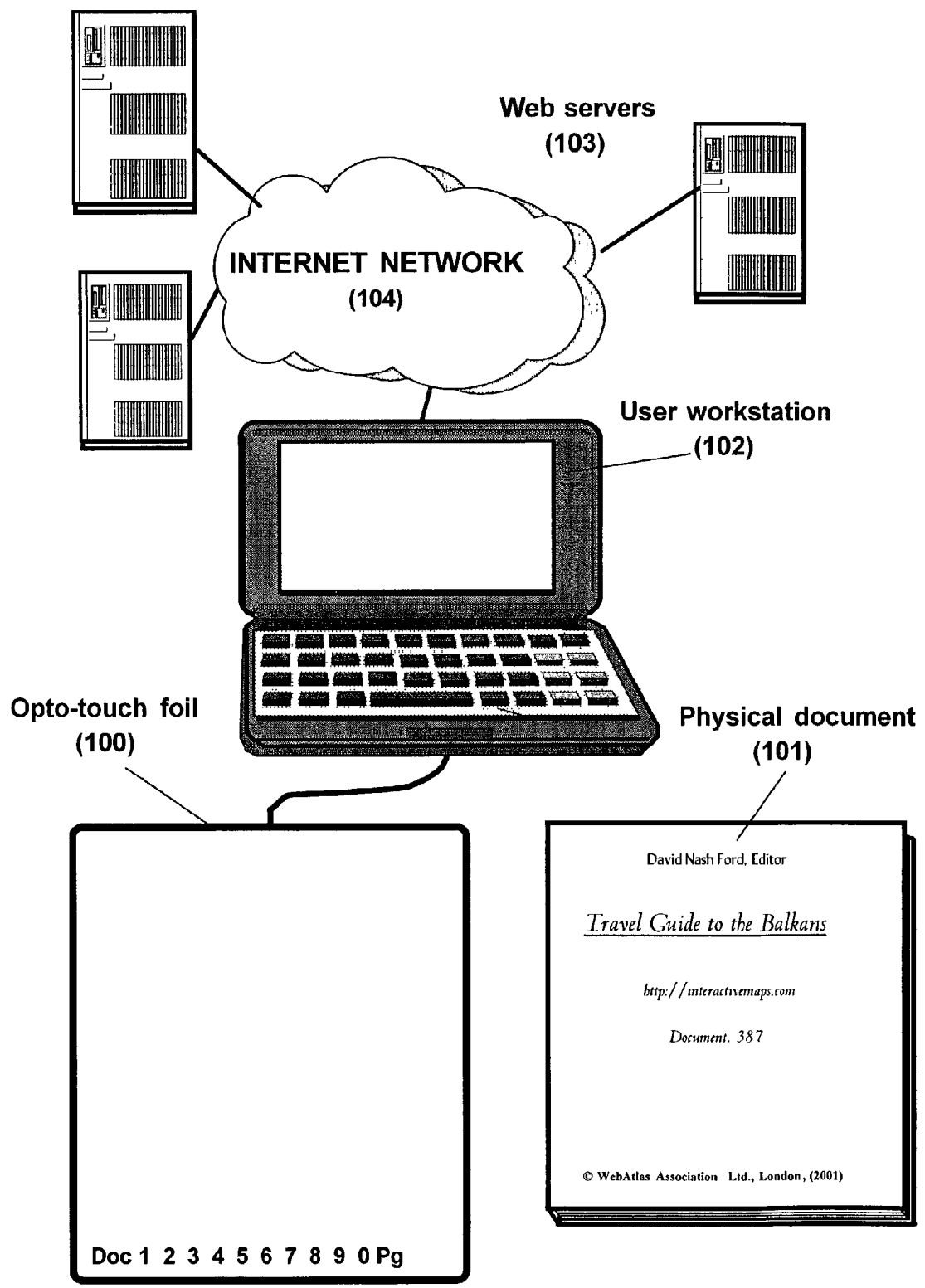
Fig. 1: Main components of the invention

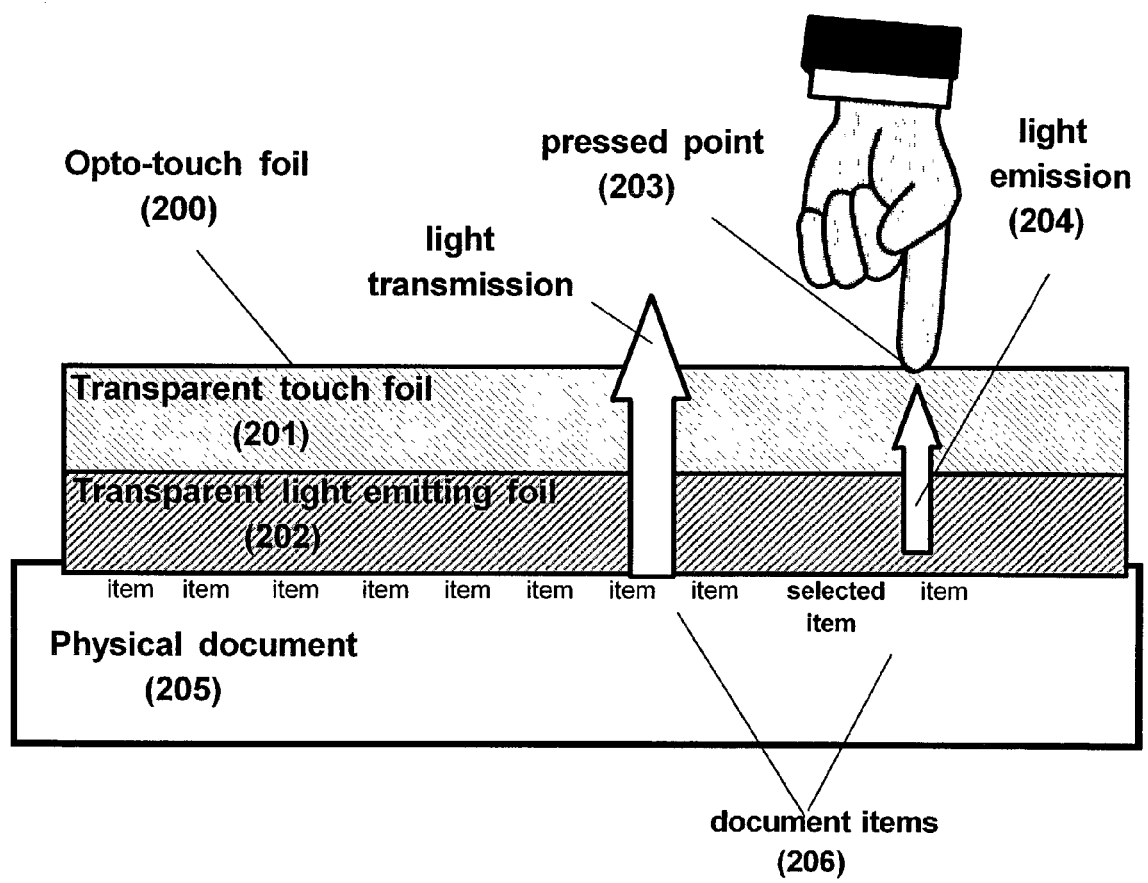
Fig. 2: Opto-touch foil

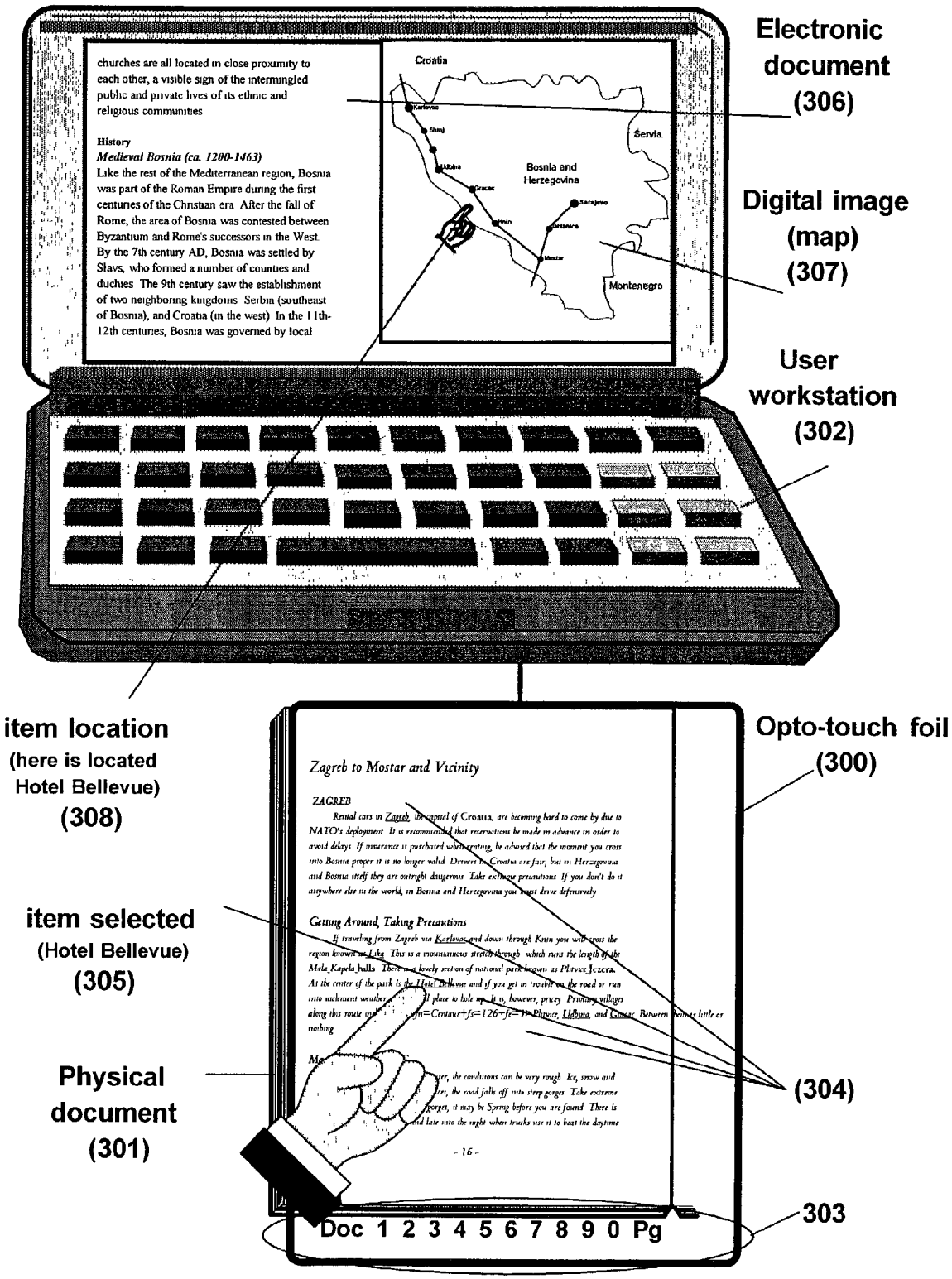
Fig. 3: Location on an electronic document (e.g., on a digital map), of an item referenced on a physical document

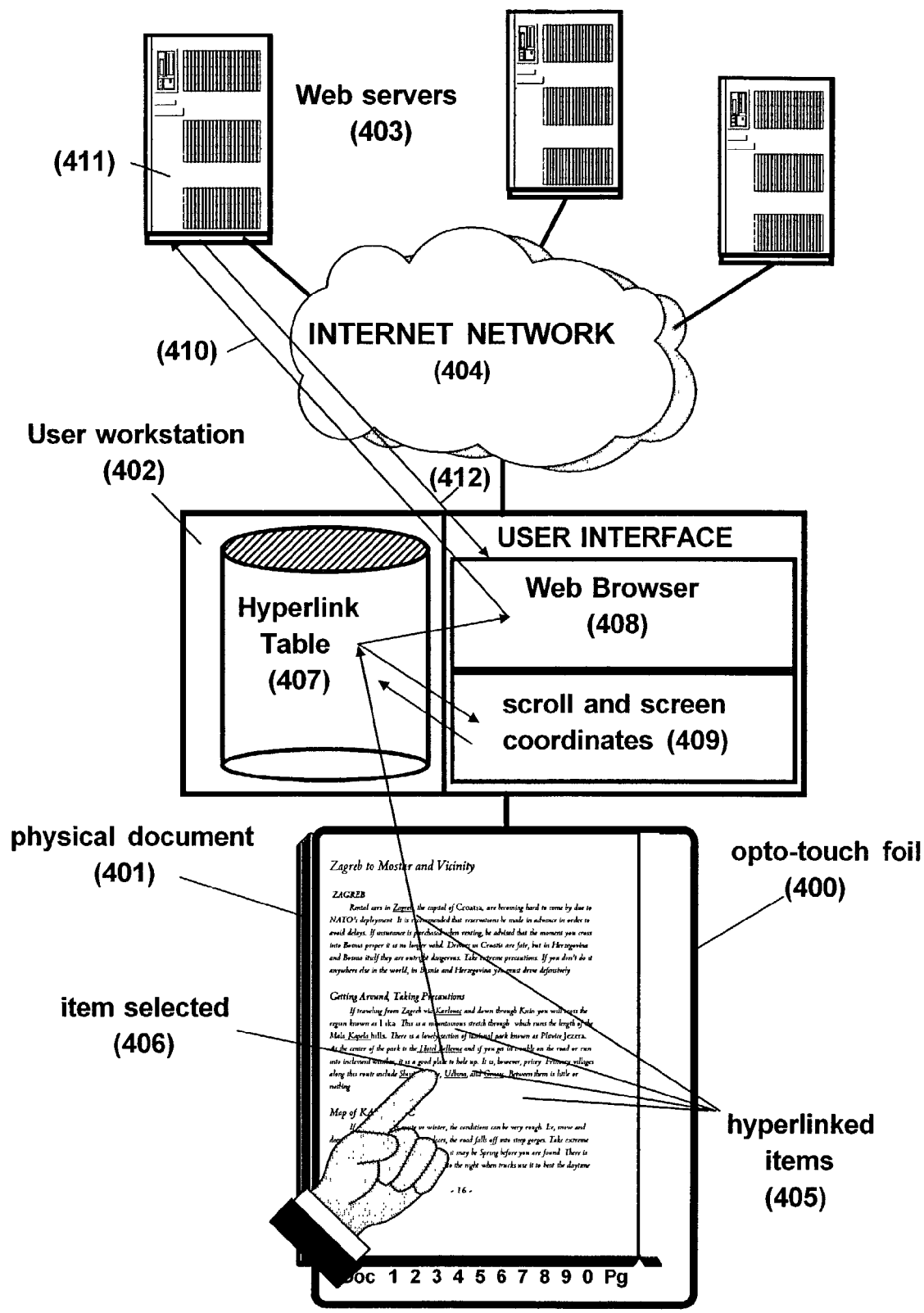
Fig. 4: Method for creating hyperlinked items

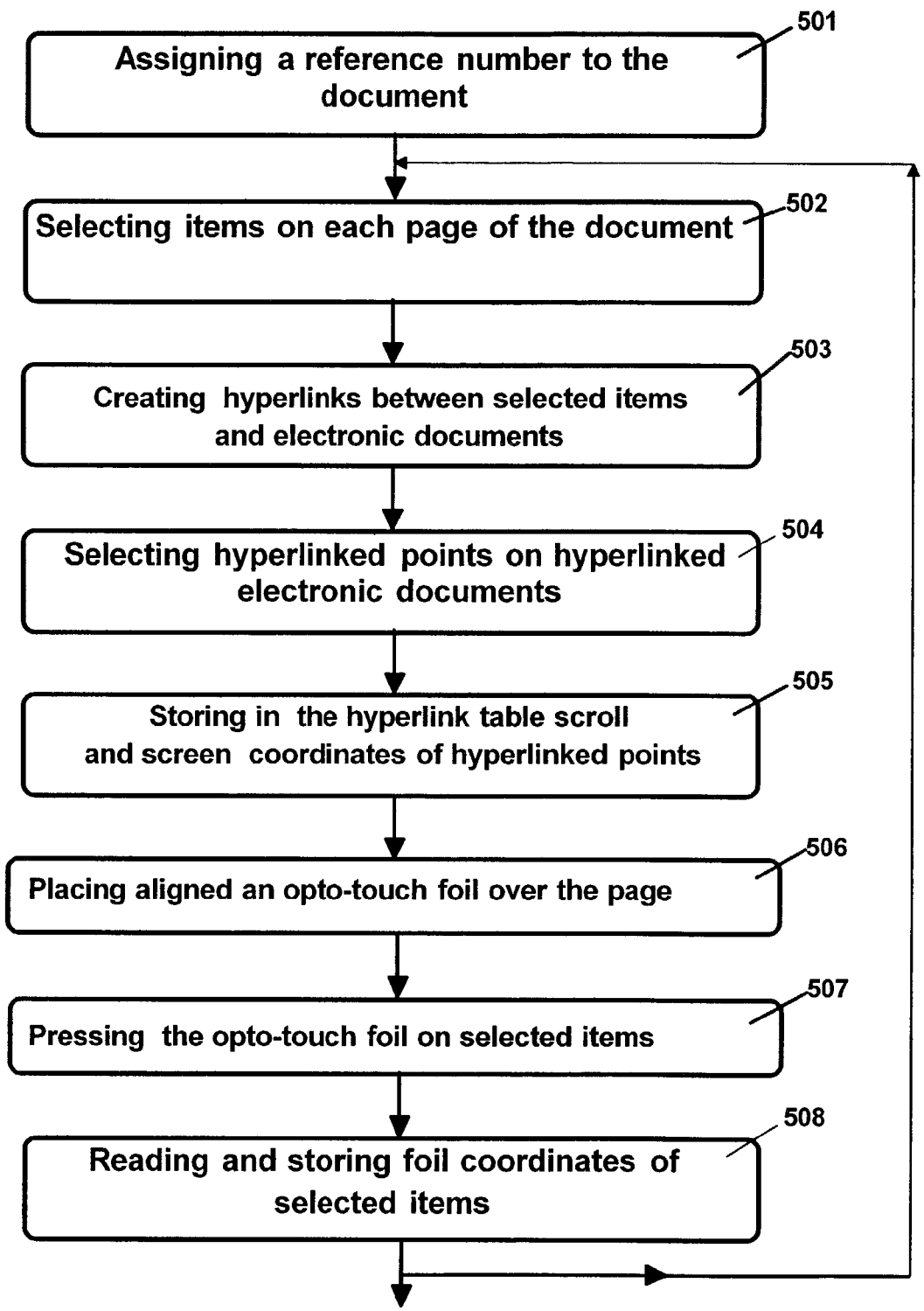
Fig. 5: Method for creating hyperlinks from items located on a physical document to points in electronic documents

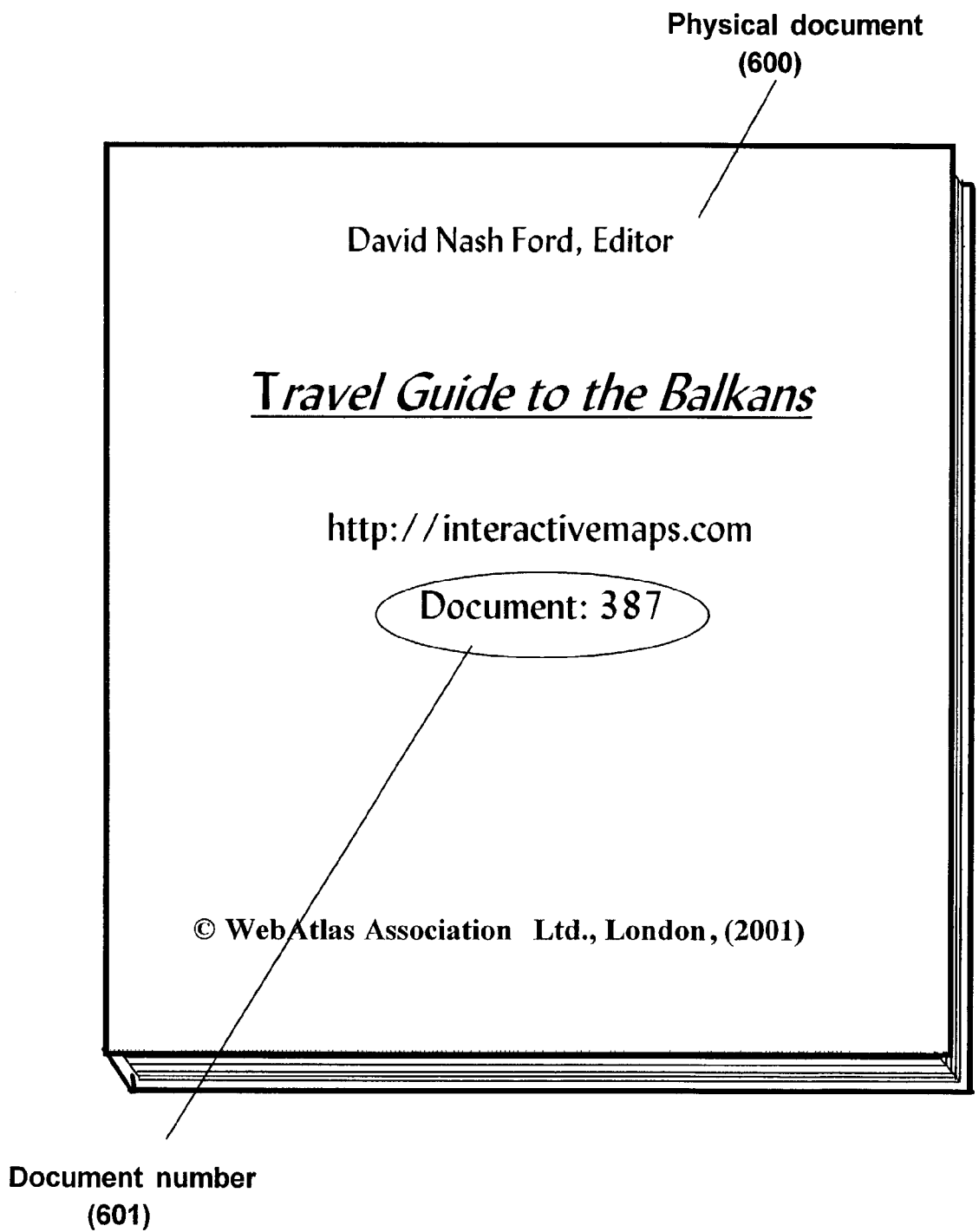
Fig. 6: A physical document

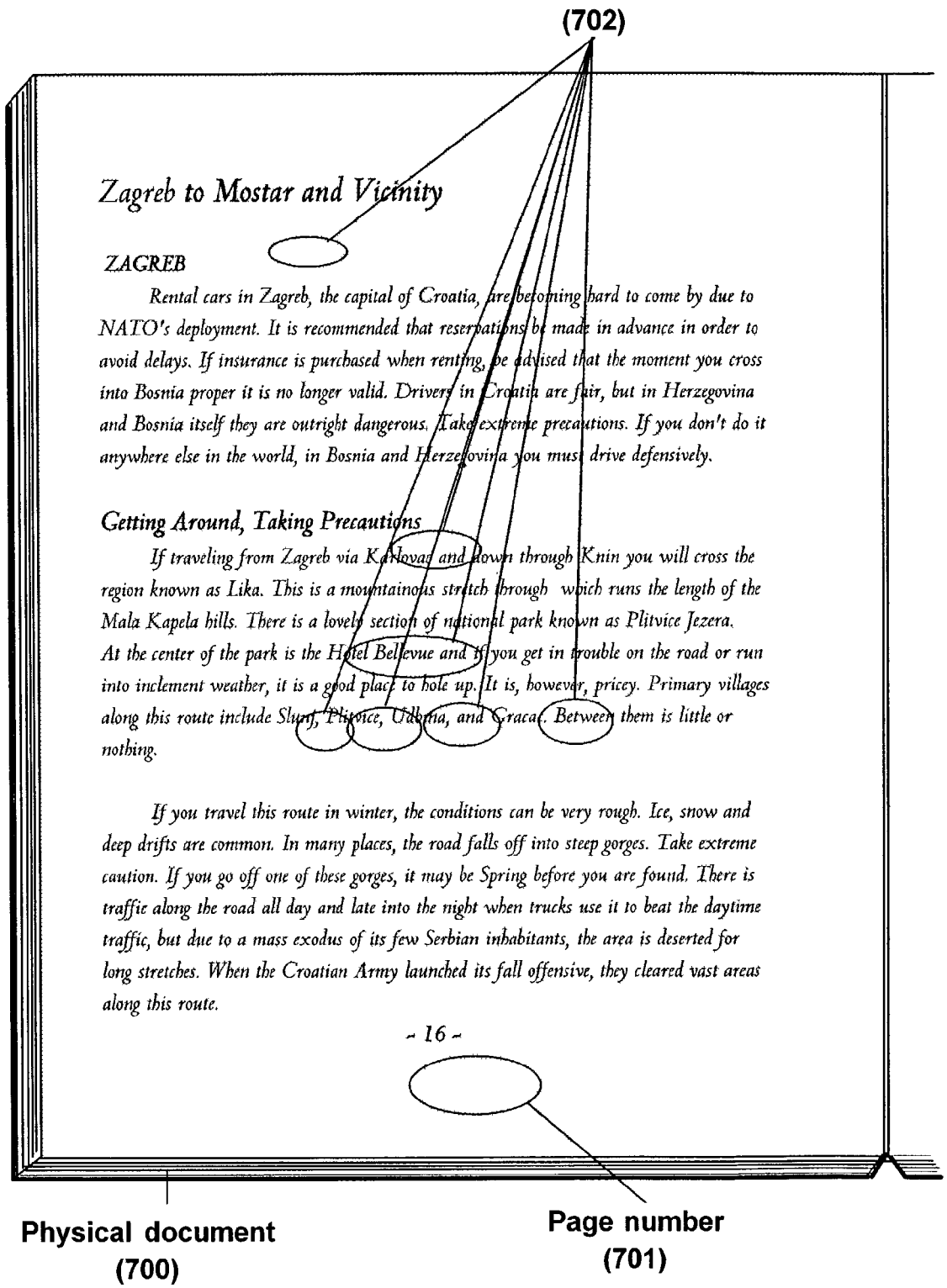
Fig. 7: A page of a physical document

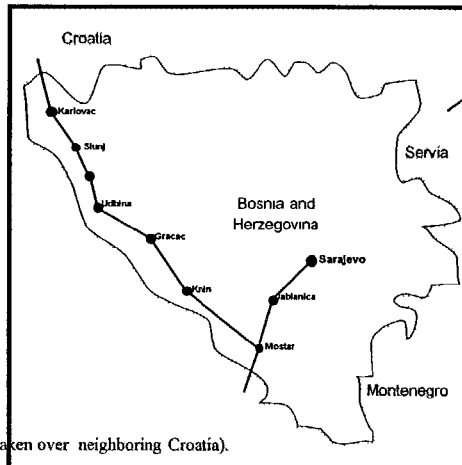
Fig. 8: A hyperlinked electronic document including a digital map

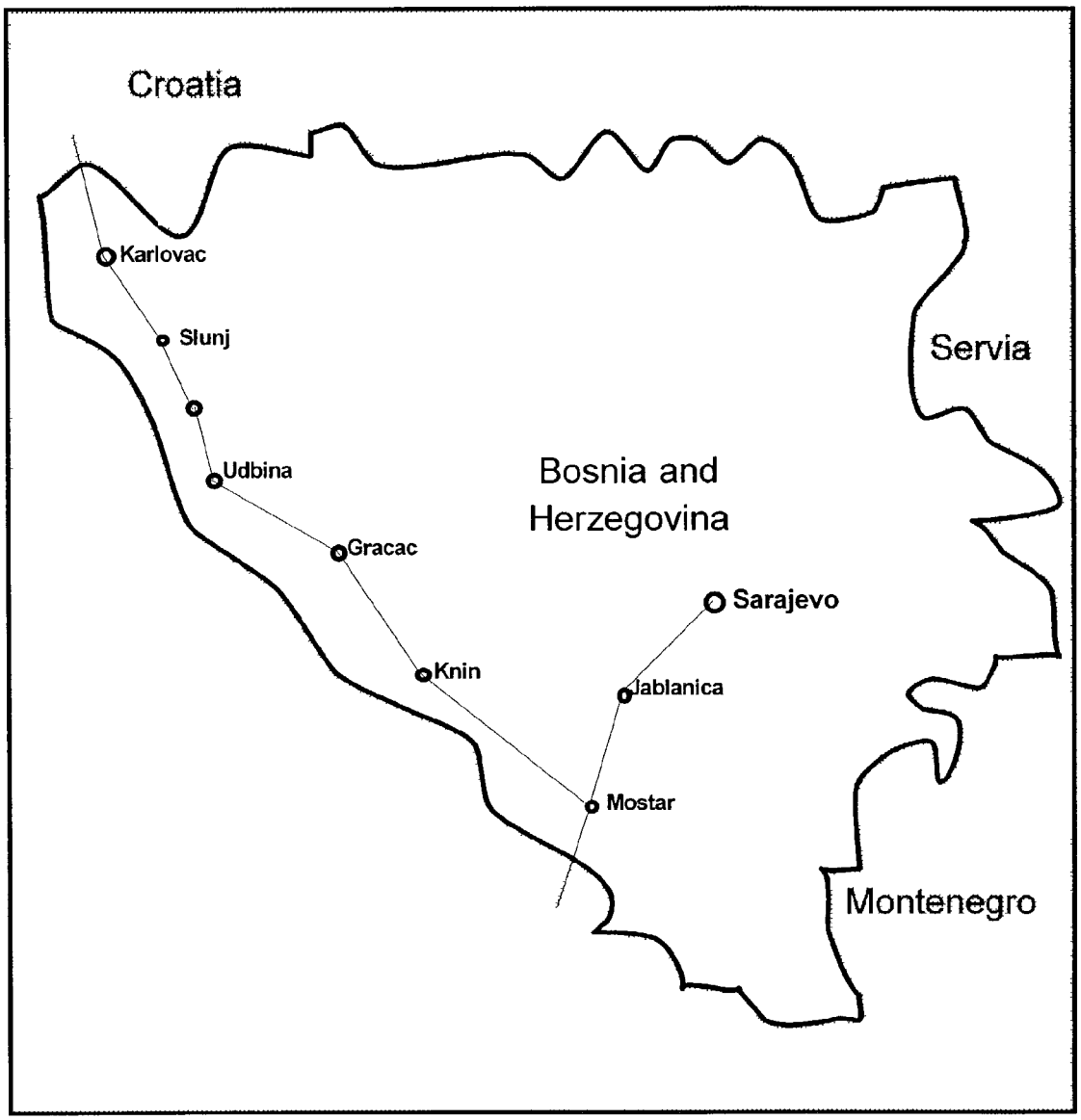
Fig. 9: Detail of the digital map comprised in the hyperlinked electronic document

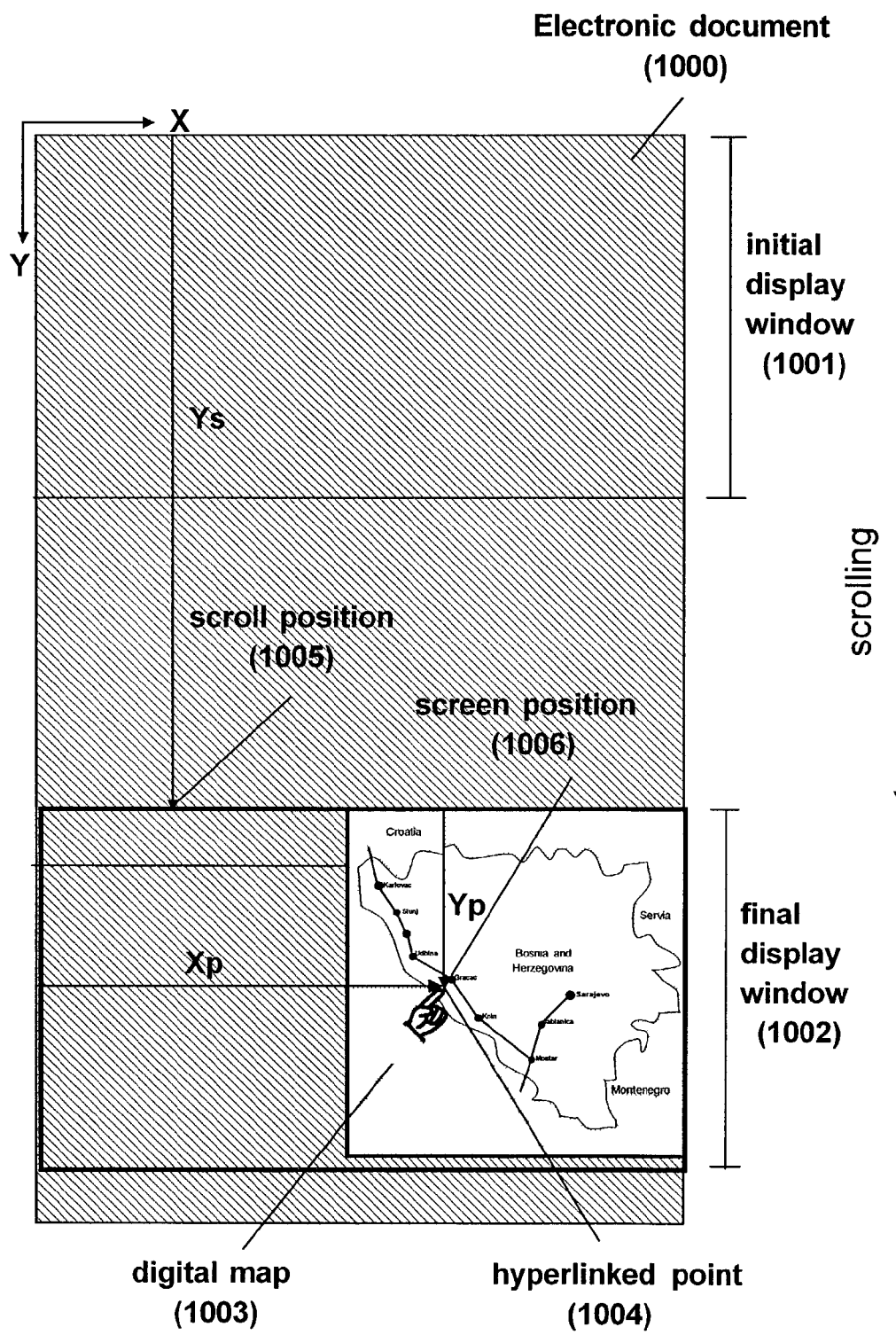
Fig. 10: Moving the display window and positioning the pointer on the hyperlinked location

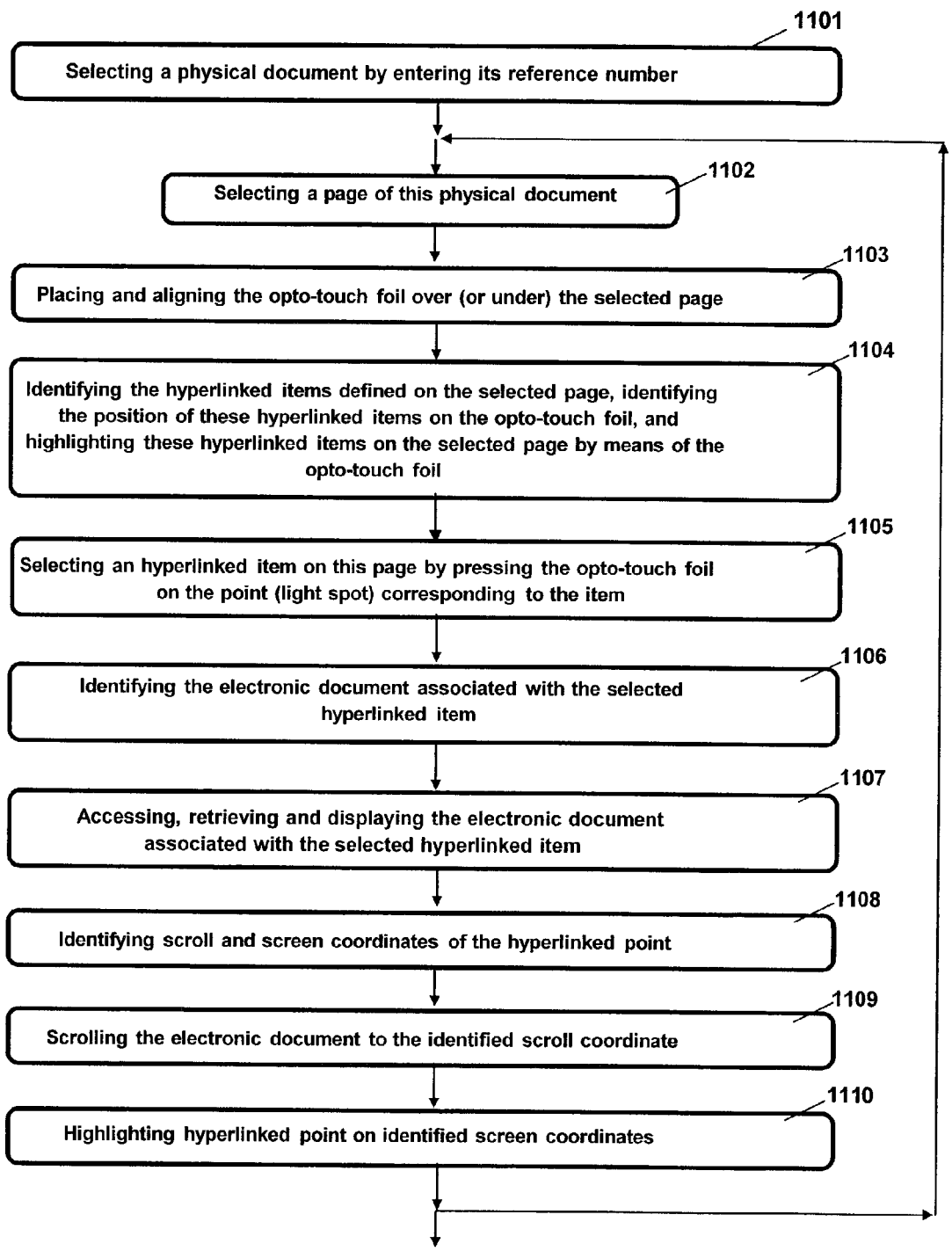
Fig. 11: Method for activating hyperlinks from items on a physical document to points in an electronic document

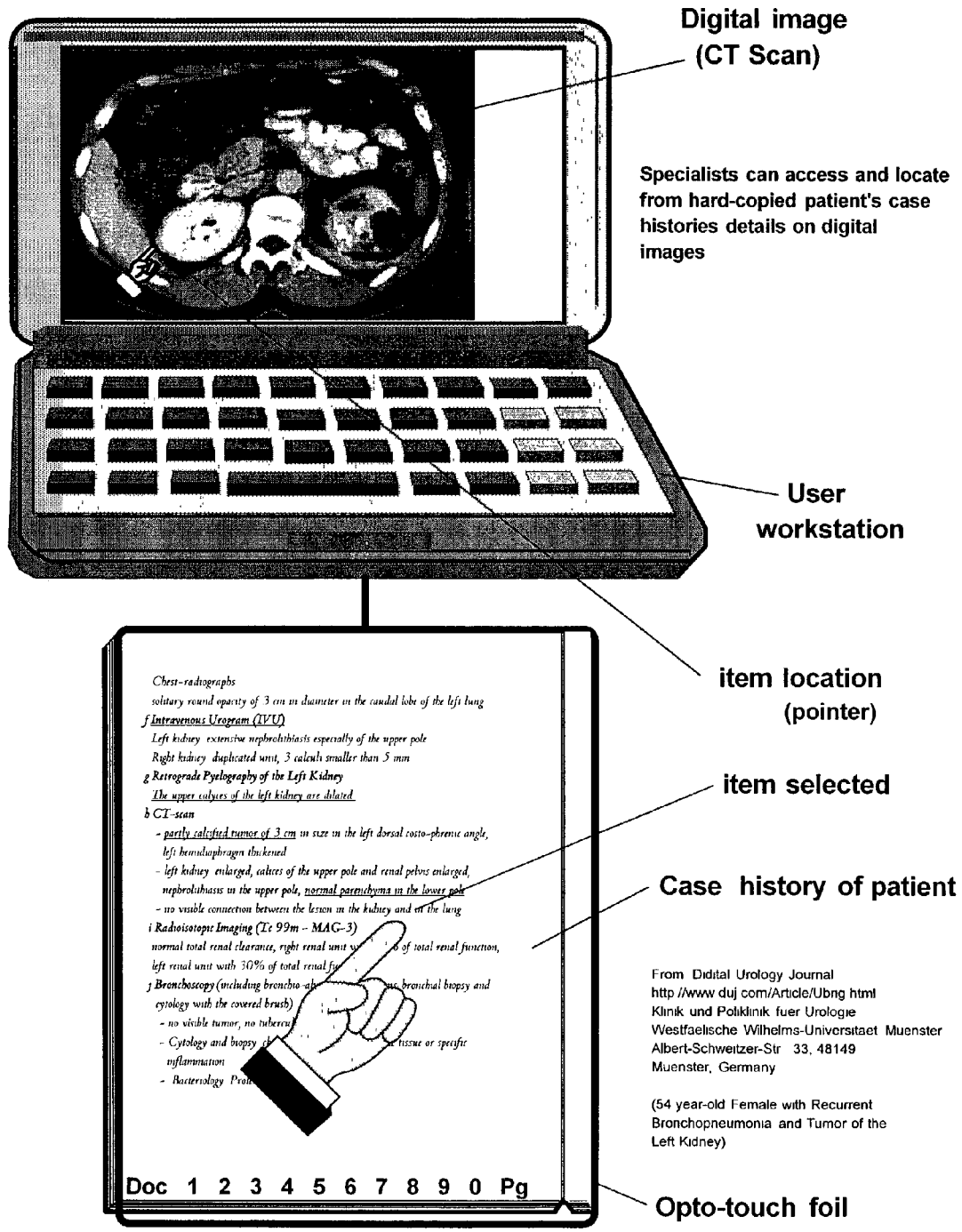
Fig. 12: Location on a digital CT scan of items referenced on a hard-copy clinical history

SYSTEM AND METHOD FOR LOCATING ON ELECTRONIC DOCUMENTS ITEMS REFERENCED IN A PHYSICAL DOCUMENT

RELATED APPLICATIONS

This application claims foreign priority benefits under 35 U.S.C. §119(a)–(d) of European Patent Application No. 02368026.7, filed Mar. 21, 2002.

FIELD OF THE INVENTION

The present invention relates to interactive hypermedia systems and more particularly to a method, system and computer program for locating on electronic documents items referenced in a physical document.

BACKGROUND OF THE INVENTION

The Internet is a global network of computers and computer networks (the "Net"). The Internet connects computers that use a variety of different operating systems or languages, including UNIX, DOS, Windows, Macintosh, and others. To enable communication among these various systems and languages, the Internet uses a language referred to as TCP/IP ("Transmission Control Protocol/Internet Protocol"). TCP/IP protocol supports three basic applications on the Internet: transmitting and receiving electronic mail, logging into remote computers (the "Telnet"), and transferring files and programs from one computer to another ("FTP" or "File Transfer Protocol").

With the increasing size and complexity of the Internet, tools have been developed to help find information on the network. These tools are often called navigators or navigation systems. Navigation systems that have been developed include standards such as Archie, Gopher and WAIS. The World Wide Web ("WWW" or "the Web") is a recent and superior navigation system. The Web is: an Internet-based navigation system, an information distribution and management system for the Internet, and a dynamic format for communicating on the Web.

The Web seamlessly integrates various kinds of information, including still images, text, audio and video. A Web user with a graphical user interface ("GUI", pronounced "gooey") may transparently communicate with different host computers on the system, different system applications (including FTP and Telnet), and different information formats for files and documents including, for example, text, sound and graphics.

The Web uses hypertext and hypermedia. Hypertext is a subset of hypermedia and refers to computer-based "documents" in which readers move from one place to another within a document, or from one document to another, in a non-linear manner. To do this, the Web uses a client-server architecture. The Web servers enable the user to access hypertext and hypermedia information through the Web and the user's computer. (The user's computer is referred to as a client computer of the Web Server computers.) The clients send requests to the Web Servers, which react, search and respond. The Web allows client application software to request and receive hypermedia documents (including formatted text, audio, video and graphics) with hypertext link capabilities to other hypermedia documents, from a Web file server.

The Web, then, can be viewed as a collection of document files residing on Web host computers that are interconnected by hyperlinks using networking protocols, forming a virtual "web" that spans the Internet. A resource of the Internet is unambiguously identified by a Uniform Resource Locator (URL), which is a pointer to a particular resource at a particular location. A URL specifies the protocol used to access a server (e.g. HTTP, FTP, and so forth), the domain name of the server, the port address to be used for communication, and the location of a file on that server. Thus, when a user selects a hyperlink, the system uses the URL to establish communication with a server computer designated in the URL and displays a document or content retrieved from the server.

Each Web page may appear as a complex document that integrates, for example, text, images, sounds and animation. Each such page may also comprise hyperlinks to other Web documents so that a user at a client computer may click on icons with a mouse and thereby activate hyperlink jumps to a new page on the same or a different Web server.

A Web server is a software program on a Web host computer that answers requests from Web clients, typically over the Internet. All Web servers use a language or protocol to communicate with Web clients called Hyper Text Transfer Protocol ("HTTP"). All types of data can be exchanged among Web servers and clients using this protocol, including Hyper Text Markup Language ("HTML"), graphics, sound and video.

On the Web, documents are generally created in HTML. HTML describes the layout, contents and hyperlinks of the documents and pages. Each HTML document supports embedded hyperlinks that reference other locations (folder, FTP site, other HTML documents, etc.) allowing the client computer to jump to another location when the user selects a hyperlink by clicking on the hyperlink or pressing an appropriate keystroke.

HTML allows, by example, to embed graphical images in HTML documents. For embedding a digital image in an HTML document, the dimensions of the embedded digital image can be specified with HTML statements. For example, an embedded graphical image may be defined in HTML by:

<IMG SRC="image_file.gif" WIDTH=X HEIGHT=Y> where:
  IMG is an HTML tag that references an embedded image,
  SRC="image_file.gif" specifies the path and the name of the file comprising the digital image embedded in the HTML document, (e.g., a Graphics Information file or *.GIF), and
  X,Y are the width and height, respectively, of the digital image measured in pixels.
  When browsing, Web clients convert user specified commands into HTTP GET requests, connect to the appropriate Web server to get information, and wait for a response.

The response from the server can be the requested document or an error message. After the document or an error message is returned, the connection between the Web client and the Web server is closed.

After receipt, the Web client formats and presents the data. To present the data, the Web client can activate an ancillary application such as a sound player according to the various types of data received. The Web Client is also referred to as the Web Browser, since it browses documents retrieved from the Web Server.

Interactive electronic services, video-on-demand, and the World Wide Web are providing access to an increasing offering of movies, shopping information, games, multimedia documents, electronic commerce and. many other services. During these last years, due mainly to the general use of personal computers and the capability of millions of users to access the World Wide Web, "multimedia publishing" has veritably exploded. Due to the widespread penetration of CD-ROM drives, an enormous number of multimedia works combining text, images and sounds, are now accessible to owners of personal computers. Furthermore, a vast choice of hypermedia information is today accessible via the Internet on the World Wide Web.

A major problem in using these multimedia systems is to browse the enormous diversity and quantity of information, to discover what is available, and to make a selection among all the possible choices. For instance, when surfing on the Web, a conventional method of navigating across the pages of hypertext documents consists in using search tools or invoking bookmarked links. When surfing on video-on-demand services, a conventional navigation method is to pass from channel to channel. Advertisements on preview channels are used as entry points to various movies. Users can navigate and make selections using hierarchical menus. Obviously, these navigating means do not enable a simple user to access and browse the thousands of multimedia documents that are available on the Web or interactive TV.

For all kind of reasons, people more and more often want to be rapidly and easily informed about their environment. They need to have information about the resources or services located in different regions of the world, in rural, industrial or urban areas. This common need was already identified a long time ago by Geographic Information Systems (GIS) providers, cartographic information providers and, more recently, by many Internet information providers.

These institutions and many others (e.g.: travel agencies, government agencies, local authorities, etc.) today provide geographic and cartographic information in the Web by means of various services. Basically, these services enable the user to access, browse or download many different types of digitized maps covering practically all regions of the world. Recently, due mainly to the widespread use of the Global Positioning System (GPS) and in-vehicle computerized navigation systems, and due to the capability of millions of users to access the World Wide Web, "digital map publishing" has veritably exploded. Due to the widespread use of CD-ROMs, a large number of geographic maps are now available to owners of personal computers. Because Internet users can access GIS (Geographic Information System) applications from their browsers without purchasing proprietary GIS software, WebGIS has the potential to make Distributed Geographic Information (DGI) available to a very large worldwide audience. Due to this rapid evolution, a vast choice of geographic and cartographic information is today accessible by means of Internet, and more particularly by means of the World Wide Web. Furthermore, WebGIS allows to use the functionality of the many GIS applications with a wide range of network-based applications in the field of business, administration, or education.

On the other hand, people are used to browsing through paper catalogs, magazines, newspapers, and books by flipping through the pages and glancing at pictures and text. Even if the enthusiasm of the public for new computer-based multimedia services can be considered as a threat to the conventional forms of hard-copied publishing, particularly book publishing, the reality is that reading a book cannot be compared with reading electronic media. Even when many electronic systems attempt to replace paper by providing many advantages such as, for example, a better access to multimedia services, reading paper remains today preferable for most people, whether they are familiar with computers or not.

A Publication entitled "The Last Book", (*IBM Systems Journal*, Vol 36, No. 3 Vol 36, No. 3-1997, by J. Jacobson, et al.), clearly illustrates the differences between printed books and computer screens in the following terms:

"A book represents a fundamentally different entity than a computer screen in that it is a physical embodiment of a large number of simultaneous high-resolution displays. When we turn the page, we do not lose the previous page. Through evolution the brain has developed a highly sophisticated spatial map. Persons familiar with a manual or textbook can find information that they are seeking with high specificity, as evidenced by their ability to remember whether something that was seen only briefly was on the right side or left side of a page, for instance. Furthermore their haptic connection with the brain's spatial map comprises a highly natural and effective interface, when such information is embodied on actual multiple physical pages.

Another aspect of embodying information on multiple, simultaneous pages is that of serendipity and comparison. We may leaf through a large volume of text and graphics, inserting a finger bookmark into those areas of greatest interest. Similarly, we may assemble a large body of similar matter in order to view elements in contrast to one another, such as might be done to determine which of a particular set of graphical designs is most satisfying".

So even if the enthusiasm of the public for computer-based digital technology might be seen as a threat to conventional paper documents, in reality the use of physical documents remains preferable to most people, whether they are skilled or not in using computers.

Nevertheless, physical documents lack the many advantages provided by today's computer technology. Thus, there is a need for new ways to enhance the usefulness of physical documents by providing the documents the advantages of computer-based technology.

To make additional information directly accessible from printed publications, U.S. patent application Ser. No. 09/841,930, entitled "Method and system for accessing interactive multimedia information or services by touching highlighted items on physical documents" discloses a system and method for selecting and accessing multimedia information and/or services located on a user workstation (or on one or a plurality of servers connected to a communication network) simply by touching with a finger, items (words, letters, symbols, pictures, icons, . . . ) that are electronically illuminated over the surface of a hard-copy document (or any other physical surface) by means of an opto-touch foil. The referenced system includes: an opto-touch foil preferably transparent, placed by the user over (or under) the document (or a portion of the document). This opto-touch foil is used: to illuminate and highlight hyperlinked items over the surface of the physical document (or portion of this document), and to read coordinates of these hyperlinked items, an user workstation for accessing and displaying the information and/or the service associated with the hyperlinked items.

The hyperlinked items are identified by means of a luminous signal (or light spot) generated by the opto-touch foil. The opto-touch foil operates under the control of the user workstation. Illuminated items are selected by pressing the opto-touch foil. When the user selects an item among all illuminated items, the user workstation receives from the opto-touch foil a signal indicating the position of this selected item. The user workstation identifies and locates referring to a hyperlink table the information and/or the service associated with the position of the selected item. If the information and/or service is located in a remote server, a request is sent to this server. If the information and/or the service is stored in the user workstation, then this information and/or service is accessed locally.

Using the same opto-touch foil, U.S. patent application Ser. No. 09/892,399, entitled "System and method for locating on a physical document items referenced in a electronic document", discloses a method and system for using the same opto-touch foil for locating on a physical document items referenced in an electronic document. In an illustrative embodiment, this invention enables to highlight on a paper map the geographic position of places referenced in a Web page.

Also, using opto-touch foils, U.S. patent application Ser. No. 09/923,150, entitled: "System and method for locating on a physical document items referenced in another physical document", discloses a method and system for creating hyperlinks from items (e.g. words, pictures, foot notes, symbols, icons) on a first physical document to particular points on a second physical document (manuscript or printed document), for activating these hyperlinks simply by touching the first document, and for highlighting, by means of a light emitting source, the position of the items on the second document. In an illustrative embodiment, the invention enables to highlight on a hard-copy map the geographic positions of places referenced in a hard-copy document.

None of the methods described in the prior art discloses a method or system that would enable a user, simply by touching with a fingertip, an item (i.e., word, icon, figure, foot note, etc.) printed on a physical (i.e., hard-copy) document, to highlight the position of this item (or the location of the information related to this items) on an electronic document.

Generally, there is a real need to provide new systems and methods for enriching the static information comprised in conventional paper documents.

There is a need, using items printed on a physical document, to create hyperlinks with electronically stored documents and to automatically identify and locate the, position of the hyperlinked items on the electronic documents.

In particular, there is a need to provide mobile users with additional information directly accessible from hard-copy documents and more particularly to illuminate on digital maps, places referenced on hard-copy documents.

It is an object of the invention to combine the advantages of searching and browsing textual information on hard-copy documents with the advantages of displaying graphic elements on electronic documents accessed and retrieved on a network.

It is another object of the present invention to highlight on a digital (electronic) document, information related to items selected in a physical document (or more generally on a physical surface).

It is a further object of the present invention to enable a user, when browsing a printed document comprising references to locations in the world (e.g., names of towns, oil posts, motels, hospitals, monuments, etc.), to receive and display a digital map and to show the position of the locations illuminated over the digital map, even when the locations are not initially represented on it.

SUMMARY OF THE INVENTION

The present invention generally relates to interactive hypermedia systems and more particularly to a method, system and computer program for locating on electronic documents items referenced on physical documents. More particularly, the present invention discloses a method, system and computer program for creating hyperlinks from one or a plurality of items (e.g. words, pictures, foot notes, symbols, icons) on a physical document to electronic documents and for activating anyone of these hyperlinks simply by touching a selected item on the physical document, for accessing, retrieving and displaying the hyperlinked electronic document and for pointing to the position (or positions) of the selected item on the displayed electronic document. In a particular embodiment, the present invention discloses a method, system and computer program for locating on digital images (e.g., digital maps) the positions of items (e.g., locations names) referenced in a hard-copy document.

According to one aspect of the invention, a method of creating hyperlinks from hyperlinked items referenced in a physical document to an electronic document comprises: (a) creating a hyperlink table for the physical document, the physical document having at least one page; (b) for each page of the physical document, storing in the hyperlink table means for identifying a page and means for identifying at least one hyperlinked item defined on the page; (c) determining the position of points pressed on an opto-touch foil aligned with the page of the physical document; the points corresponding to the positions of the hyperlinked items; (d) storing in the hyperlink table the position of the points pressed, the hyperlink table comprising for each hyperlinked item, an indication of a position on the page; and (e) for each hyperlinked item defined on the page: (i) associating an electronic document; (ii) storing in the hyperlink table data identifying and locating the electronic document; (iii) associating one or a plurality of hyperlinked points located on the electronic document; and (iv) storing in the io hyperlink table the position of each hyperlinked point on the electronic document.

According to a second aspect of the invention, a method for activating hyperlinks from one or a plurality of items referenced in a physical document to one or a plurality of points in electronic documents, comprises: (a) identifying a physical document; (b) identifying a page in the physical document; (c) determining the position of a point pressed on an opto-touch foil placed and aligned over or under the identified page, the opto-touch foil being pressed at a point corresponding to a selected hyperlinked item; (d) identifying the selected hyperlinked item by referring to a hyperlink table associated with the physical document, the hyperlink table comprising an indication of the position on the identified page of the physical document of each referenced hyperlinked item; (e) identifying and locating the electronic document associated with the selected hyperlinked item referring to the hyperlink table, the hyperlink table comprising for each hyperlinked item of each page of the document the identification and location of the electronic document associated with the hyperlinked item; (f) accessing and displaying the electronic document associated with the selected hyperlinked item; (g) identifying the position on the electronic document of each point hyperlinked with the selected hyperlinked item referring to the hyperlink table, the hyperlink table comprising for each hyperlinked item referenced in the physical document, the position of one or a plurality of points on the electronic document; and (h)

designating the position on the displayed electronic document, of each point hyperlinked with the selected item.

According to a third aspect of the invention, a computer program product for use with a computer system capable of creating hyperlinks from hyperlinked items referenced in a physical document to an electronic document, the computer program product comprising a computer useable medium having embodied therein program code comprising: (a) program code for creating a hyperlink table for the physical document, the physical document having at least one page; (b) for each page of the physical document, program code for storing in the hyperlink table means for identifying a page and means for identifying at least one hyperlinked item defined on the page; (c) program code for determining the position of points pressed on an opto-touch foil aligned with the page of the physical document; the points corresponding to the positions of the hyperlinked items; (d)program code for storing in the hyperlink table the position of the points pressed, the hyperlink table comprising for each hyperlinked item, an indication of a position on the page; and (e) for each hyperlinked item defined on the page, program code for: (i) associating an electronic document; (ii) storing in the hyperlink table data identifying and locating the electronic document; (iii) associating one or a plurality of hyperlinked points located on the electronic document; and (iv) storing in the hyperlink table the position of each hyperlinked point on the electronic document.

According to a fourth aspect of the invention, a computer program product for use with a computer system capable of activating hyperlinks from one or a plurality of items referenced in a physical document to one or a plurality of points in electronic documents, the computer program product comprising a computer useable medium having embodied therein program code comprising:(a) program code for identifying a physical document; (b) program code for identifying a page in the physical document; (c) program code for determining the position of a point pressed on an opto-touch foil placed and aligned over or under the identified page, the opto-touch foil being pressed at a point corresponding to a selected hyperlinked item; (d) program code for identifying the selected hyperlinked item by referring to a hyperlink table associated with the physical document, the hyperlink table comprising an indication of the position on the identified page of the physical document of each referenced hyperlinked item; (e) program code for identifying and locating the electronic document associated with the selected hyperlinked item referring to the hyperlink table, the hyperlink table comprising for each hyperlinked item of each page of the document the identification and location of the electronic document associated with the hyperlinked item; (f) program code for accessing and displaying the electronic document associated with the selected hyperlinked item; (g) program code for identifying the position on the electronic document of each point hyperlinked with the selected hyperlinked item referring to the hyperlink table, the hyperlink table comprising for each hyperlinked item referenced in the physical document, the position of one or a plurality of points on the electronic document; and (h) program code for designating the position on the displayed electronic document, of each point hyperlinked with the selected item.

The foregoing, together with other objects, features, and advantages of this invention can be better appreciated with reference to the following specification, claims and drawings.

BRIEF DESCRIPTION OF THE DRAWINGS

The above and further advantages of the invention may be better understood by referring to the following description in conjunction with the accompanying drawings in which:

FIG. 1 shows the main components of the invention;

FIG. 2 shows the internal structure of an opto-touch foil;

FIG. 3 shows the elements used in the present invention to select an hyperlinked item on a physical document, to retrieve an electronic document associated with the physical document, and to display the location or position of the selected item over the associated electronic document;

FIG. 4 is a logical view of the elements used in a particular embodiment, to select an hyperlinked item on a physical document, to retrieve an electronic document associated with the physical document, and to display the location or position of the selected item over the associated electronic document;

FIG. 5 is a flowchart of the method of creating an hyperlink from an item on a physical document to a point on an electronic document according to the present invention;

FIG. 6 shows a physical document and the assigned document number;

FIG. 7 shows items of a page of a physical document for which hyperlinks must be created;

FIG. 8 shows an electronic document (including a digital map) hyperlinked to an item on a physical document;

FIG. 9 shows in detail the digital map comprised in the hyperlinked electronic document;

FIG. 10 shows how scroll and screen coordinates of a point on an electronic document are defined;

FIG. 11 is a flowchart of the method for activating hyperlinks, from items on a physical document, to points on an electronic document; and FIG. 12 shows a particular application of the present invention, used to locate on a digital CT scan items referenced on a hard-copy clinical history.

DETAILED DESCRIPTION

The present invention relates to the creation of hyperlinks from printed items (e.g. words, pictures, foot notes, symbols, icons) on a physical document to other items or particular points located on electronic documents. The hyperlinks are used to locate on the electronic documents, the items referenced in the physical document.

More particularly, by assigning display coordinates to geographic locations (for example places like towns, motels, public buildings, water springs, historic monuments, factories, etc.) cited or referenced in a physical document (for example, cited in a hard-copied travel guide), the invention provides means for highlighting on a digital map the geographic location of the places cited or referenced in the physical document. The activation of a "geographic link" associated with a particular printed item on a physical document (for example a directory of hotels), results in highlighting the position of this item on a digital map.

In a particular embodiment, the system comprises a transparent opto-touch foil placed aligned over the physical document and connected to a user workstation. The opto-touch foil generates optical signals highlighting the hyperlinked items referenced on the physical document. The system includes logic for highlighting on the hyperlinked electronic documents, the locations of the hyperlinked items referenced on the physical document.

As shown in FIG. 1, the system according to the present invention comprises an opto-touch foil (100), preferably transparent, placed by the user over (or under) a physical document (101), or a portion/page of this document. This opto-touch foil is used to illuminate and highlight hyperlinked items over the surface of the physical document, and to read coordinates of these hyperlinked items; and an user workstation (102) for accessing, retrieving and displaying electronic documents associated with the hyperlinked items referenced on the physical document and for highlighting the locations of the hyperlinked items on the electronic documents. Note in the following description the expressions "portion of a physical document" or "page of a physical document" will be used indifferently.

Physical Document

A physical documents (101) can be of any kind. It can be, for instance, a newspaper, a travel book, a novel book, a text book, a technical book, a commercial catalog or even any other type of hard-copy, engraved, written, or printed surfaces (e.g., paintings in a museum of art). The material of the physical documents can be paper, plastic, wood or any other material.

Opto-Touch Foil

In an illustrative embodiment, the opto-touch foil (100) comprises two, functionally independent transparent foils, namely: a touch foil, and a light emitting foil (opto foil).

FIG. 2 shows the cross section of an opto-touch foil (200) comprising a transparent resistive or capacitive touch foil (201), of the type used commonly to manufacture touch screens. The generated signal is generally proportional to the coordinates (X, Y) of the point that is pressed or touched (203). The opto-touch foil (200) further comprises a transparent light emitting foil (202), which is a transparent, bright, self-emitting display that can emit light (204) from either one or both surfaces.

The combination of both foils (i.e., the touch foil stacked over the light emitting foil) forms an opto-touch foil (200). FIG. 2 represents an opto-touch foil placed and aligned over a physical document (205) comprising a plurality of items (206) (i.e., words, pictures, icons, etc.) printed (or written, painted, engraved . . . ) on its surface.

Transparent Touch Foil Technology

The touch foil component (201) can be made of transparent resistive or capacitive films of the type used commonly to manufacture touch screens. One example of appropriate touch foil technology is the TouchTek4 (4-wire Analog Resistive Touchscreens) of MICRO TOUCH company (TouchTek™ is a trademark of the MICRO TOUCH Company). The TouchTeck4 technology is fully described in the Web site of MICRO TOUCH Company.

TouchTek4 touchscreens are commonly used in hand-held personal information management systems, PDAs, mobile computing systems, automotive, diagnostics and telecom devices, and Internet appliances. TouchTek4 touchscreens are engineered to accept more than three million touches to any area of the screen.

Light Emitting Foil (Opto-foil)

The light emitting foil (202) can be made of an array of TOLED's (Transparent Organic Light Emitting Devices), of the type used today to create vision area displays on windshields, cockpits, helmets and eyeglasses. TOLED displays, which can be up to 85% transparent when not energized are today manufactured with standard silicon semiconductors. One example of light emitting foil technology it would be possible to use is the technology used for the TOLEDs manufactured by UNIVERSAL DISPLAY CORPORATION. The TOLED technology is fully described in the Web site of UNIVERSAL DISPLAY CORPORATION, Ewing, N.J. at http://www.universaldisplay.com/

Since TOLEDs are thin-film, solid-state devices, they are very thin, lightweight and durable, ideal for portable applications, like the one disclosed in the present invention. TOLEDs can be bottom, top, or both bottom and top emitting. Also, TOLEDs technology has attractive advantages regarding, transparency (TOLED displays can be nearly as clear as the glass or substrate they're on and when built between glass plates, TOLEDs are >80% transparent when turned off), energy efficiency (for longer battery life), full viewing angle, bright and high contrast light emission, fast response time, and environmental robustness. Thus, TOLEDs are well suited for manufacturing the light emitting foil component used jointly with the touch foil (201) according to the present of this invention.

User Workstation

The user workstation (102) is used to receive from the opto-touch foil (100) the foil coordinates of the points pressed on the physical document (101), to send to the opto-touch foil (100) the foil coordinates of the hyperlinked items to highlight, and to access, retrieve and display the electronic documents locally stored or located on one or a plurality of servers (103) connected to the network (104).

Preferably, the user workstation (102) is connected to the Internet network (104) and comprises a Web Browser application. Servers (103) are Web servers. In an illustrative embodiment, electronic documents are digital maps (e.g., HTML Web pages representing geographic maps) hyperlinked to selected items printed or engraved on the physical document (101).

The user workstation can be, for example an Internet enabled cell phone (e.g., the NOKIA 7110 or the 9110i Communicator), a PDA, an onboard computer, a network computer, an Internet appliance, a multimedia Personal Computer (PC), a set-top box, a WebTV, a game console or any wireless IP enabled device communicated with the opto-touch foil (100). The opto-touch (100) foil can communicate with the user workstation (102) by means of a cable, a wire pair, an infrared link, or a wireless radio link.

Information Access and Display

As illustrated by FIG. 3, to select a particular portion of a physical document (301) (a page of a book for example), the user places over (or under) this portion the opto-touch foil (300) and enters in the workstation (302) the reference of this portion (the page number for example). In an illustrative embodiment, the page number can be entered simply by touching some buttons (303) marked on the top (or bottom) of the opto-touch foil (300). The page number can be also entered directly by means of the keyboard, the mouse or the touch screen of the user workstation or by any other means such as a bar code reader.

In an illustrative embodiment, hyperlinked items (304) on a page are automatically illuminated and highlighted by the opto-touch foil (300) placed on the surface of this page. The light emitting foil operates under the control of the user workstation (302). This illumination and highlighting allows the localization and identification of all hyperlinked items on the page selected by the user.

In order to access to a digital map (307) and to highlight on the map the location (308) of an hyperlinked item (305) printed on the physical document (301), the user touches with its finger or exercises a pressure on the portion of the opto-touch foil (300) placed over (or under) the hyperlink item (305) he wants to select. The position of the hyperlinked item (305) selected on the opto-touch foil (300) is used to identify and locate the server (103) and the information within this server (e.g., a Web page that comprises a digital map) the user wants to access. The user workstation (302) then accesses the identified server (103), and retrieves and displays the information (306) associated with the selected item (305). The position of the hyperlinked item (305) selected on the opto-touch foil (300) is also used to determine the points (or points) (308) hyperlinked to this item, on the retrieved displayed document (306) (preferably a digital map (307)). In an illustrative embodiment, the position corresponding to the item (305) selected in the physical document is automatically highlighted (308) or marked on the retrieved electronic document (306) by means a luminous signal or a pointer generated by the user workstation (302).

Method for Creating Hyperlinked Items

In general terms, the method of creating hyperlinks from items (304) on a physical document (301) to particular points (308) on electronic documents (306), comprises the steps of:

creating an hyperlink table (407) for the physical document (401); the physical document comprising one or a plurality of pages;

receiving and storing in the hyperlink table (407) an identification of the physical document (401);

for each page of the physical document (401):

receiving and storing in the hyperlink table (407) an identification of the page and an identification of one or a plurality of hyperlinked items (405) defined on the page;

for each hyperlinked item (304) defined on the page, associating a hyperlinked document, the step comprising the further steps of receiving and storing in the hyperlink table (407) an identification and a location of a hyperlinked digital document located on the user system (402) or on one or a plurality of servers (403);

for each hyperlinked item (305) defined on the page, associating one or a plurality of hyperlinked points (308) in the associated hyperlinked electronic document (306);

for each hyperlinked item (305) defined on the page, storing in the hyperlink table (407), the pixel coordinates (i.e., scroll and screen coordinates) of the one or plurality of associated hyperlinked points (308) when displayed on the hyperlinked electronic document (306);

placing and aligning the opto-touch foil (400) over (or under) the selected page of the physical document (401);

determining the foil position of each hyperlinked item (405) defined on the page by pressing the opto-touch foil (400) over the hyperlinked item (406); and for each hyperlinked item (405) defined on the page, storing in the hyperlink table (407) the corresponding foil position sensed by the opto-touch foil.

FIG. 5 illustrates the method of creating hyperlinks from a physical document (hand written or printed document like the document shown in FIG. 6 entitled "Travel Guide to the Balkans"), to an electronic document (for example, a digital map). The method comprises the steps of:

(501) assigning a reference number (identifier) to the physical document; and for each page of the physical document document (or portion of the document):

(502) selecting one or a plurality of items on the page;

(503) for each selected item, creating an hyperlink between the item and an electronic document;

(504) on each hyperlinked electronic document, selecting one or a plurality of hyperlinked points;

(505) storing in an hyperlink table, scroll and screen coordinates of the hyperlinked points displayed over the hyperlinked electronic documents;

(506) placing and aligning an opto-touch foil over the page;

(507) pressing the opto-touch foil over the selected items;

(508) reading and storing in the hyperlink table, the position (foil coordinates) on the opto-touch foil of the selected items on this page.

Assigning a Reference Number to the Document (501)

As shown in FIG. 6, for each physical document (600) received, the user: assigns a reference number (601) to this document (e.g., 387) for identifying the document; writes this reference number (601) on the document, and creates an hyperlink table associated with the document and accessible from the user workstation, the hyperlink table comprising the reference number of the document and other relevant information related to the document such as title, author, ISBN (International Standard Book Number), date, etc . . . The hyperlink table may be stored within the user workstation or may be stored in an external memory accessible from the user workstation.

The header of the new created hyperlink table associated with the physical document shown in FIG. 6, can be built as follows:

| Doc: 0387 | Date: | Title: | ISBN: | Author: |
|---|---|---|---|---|
| | 28/01/2001 | "Travel Guide to the Balkans" | 84-344-0856-2 | David Nash Ford, Editor Web Atlas Association, Ltd., 2001 |

Selecting Items on Pages of the Physical Document (502) and Creating Hyperlinks to Electronic Documents (503)

As shown in FIG. 7, each time the user wants to create a hyperlink for an item (702) located on the page of the physical document (700), the user enters the page number (701) where the item is referenced in the hyperlink table of the physical document (e.g., 16). The user then associates with this item on this page, means for accessing an electronic document, for instance a destination address within a communication network (e.g., an URL address for example), this destination address identifying a server connected to the communication network and within this server, the electronic document the user wants to access. The user then enters the means for accessing the electronic document in the hyperlink table.

| In an illustrative embodiment, the hyperlink table associated with the page shown in FIG. 7, appears as follows:Doc: 0387 Pg: 16 | Date: 28/01/2001 | Title: "Travel Guide to the Balkans" | ISBN: 84-344-0856-2 | Author: David Nash Ford, Editor Web Atlas Association, Ltd., 2001 |
|---|---|---|---|---|

| LINKED ITEM | FOIL X/Y mm. | ELECTRONIC DOC. URL | SCROLL POS. Ys | SCREEN POSITION (Xp, Yp) |
|---|---|---|---|---|
| Zagrev | | http://www.interconti.com/croatia/zagreb/hotel_zagic.html | | |
| Karlovak | | http://www.kakarigi.net/manu/briefhis.htm | | |
| Knin | | http://www.kakarigi.net/manu/briefhis.htm | | |
| Hotel Bellevue | | http://www.kakarigi.net/manu/briefhis.htm | | |
| Slunj | | http://www.kakarigi.net/manu/briefhis.htm | | |
| Plitvice | | http://www.kakarigi.net/manu/briefhis.htm | | |
| Udbina | | http://www.kakarigi.net/manu/briefhis.htm | | |
| Gracac | | http://www.kakarigi.net/manu/briefhis.htm | | |

The electronic document associated with the hyperlinked item can be stored locally in the user workstation. In this case, an identification of the electronic document (local address, file name, file type . . . ) within the user workstation, is entered in the hyperlink table.

The hyperlink table shows that, for example, the electronic document stored on the URL: http://www.kakarigi.net/manu/briefhis.htm has been associated with the item named "Hotel Bellevue". FIG. 8 shows the content of this hyperlinked electronic document (800), which comprises a digital map (801). FIG. 9 shows in detail the digital map. Note that the locations of the hyperlinked items named "Plitvice" and "Hotel Bellevue" on physical document (700) are not referenced nor represented on this digital map Selecting Hyperlinked Points on Electronic Documents (504) and Storing Hyperlinked Points Coordinates (505)

For each hyperlinked item (305) (e.g., "Hotel Bellevue") located on the page of the physical document (301) the user accesses, retrieves and displays on the user workstation (e.g., by means of a Web browser program) the hyperlinked electronic document (800) (e.g., http://www.kakarigi.net/manu/briefhis.htm). The user then scrolls the screen to conveniently display the area of the electronic document (e.g., the digital map (801)) where the hyperlinked point is located. The scrolling action performed by the user is illustrated in the example shown in FIG. 10. The hyperlinked document (1000) is scrolled on the screen of the workstation, from an initial display window (1001) to a final display window (1002), so that, in the final scroll position (1005), the digital map (1003) comprised in the hyperlinked document (1000), can be fully displayed and conveniently viewed by the user. The user then identifies on the displayed area (1002) of the electronic document (1000), the position (1004) of the hyperlinked point, and moves the pointer to this position.

The user then clicks with the pointer on the selected point. The scroll position of the screen, Ys (1005) and the position of the point on the screen (Xp, Yp) (1006) (coordinates preferably measured in pixels) are computed (409) and copied into the corresponding entry of the hyperlink table (407).

| Once completed, the process of assigning and entering scroll and screen coordinates to the locations of the hyperlinked points on the hyperlinked electronic documents, the hyperlink table is updated as follows:Doc: 0387 Pg: 16 | Date: 28/01/2001 | Title: "Travel Guide to the Balkans" | | ISBN: 84-344-0856-2 | Author: David Nash Ford, Editor Web Atlas Association, Ltd., 2001 |
|---|---|---|---|---|---|
| LINKED ITEM | FOIL X/Y mm. | ELECTRONIC DOC. URL | | SCROLL POS. Ys | SCREEN POSITION (Xp, Yp) |
| Zagrev | | http://www.interconti.com/croatia/zagreb/hotel_zagic.html | | 619 | 578 421 |
| Karlovak | | http://www.kakarigi.et/manu/briefhis.htm | | 1457 | 78 154 |
| Knin | | http://www.kakarigi.et/manu/briefhis.htm | | 1457 | 312 473 |
| Hotel Bellevue | | http://www.kakarigi.et/manu/briefhis.htm | | 1457 | 253 345 |
| Slunj | | http://www.kakarigi.et/manu/briefhis.htm | | 1457 | 92 202 |
| Plitvice | | http://www.kakarigi.et/manu/briefhis.htm | | 1457 | 128 247 |
| Udbina | | http://www.kakarigi.et/manu/briefhis.htm | | 1457 | 149 293 |
| Gracac | | http://www.kakarigi.et/manu/briefhis.htm | | 1457 | 206 331 |

Placing and Aligning the Opto-touch Foil over a Page of the Document (506)

As shown in FIG. 4, after each hyperlinked item of a page has been defined in the hyperlink table and has been associated with an electronic document, the opto-touch foil is placed over (or under) the page, and aligned with the borders of this page using some conventional means (e.g., by adjusting the upper left corner of the opto-touch foil with the upper left corner of the page).

Pressing the Opto-touch Foil over the Selected Items and (508) Reading the Foil Coordinates (507)

As shown in FIG. 4, for each item (405) previously selected on the page ("Zagreb", "Knin", "Hotel Bellevue", "Slunj", "Plitvice", "Udvina", "Gracac"), the user presses (e.g., using his finger tip) the opto-touch foil (400) to determine the position (for instance, the coordinates) of this item on the opto-touch foil.

Once the foil coordinates of each selected item (hyperlinked item) on the page have been measured, the hyperlink table is updated as follows:

| Doc: 0387 Pg: 16 | Date: 28/01/2001 | Title: "Travel Guide to the Balkans" | | ISBN: 84-344-0856-2 | Author: David Nash Ford, Editor Web Atlas Association, Ltd., 2001 |
|---|---|---|---|---|---|
| LINKED ITEM | FOIL X/Y mm. | ELECTRONIC DOC. URL | | SCROLL POS. Ys | SCREEN POSITION (Xp, Yp) |
| Zagrev | 125 110 | http://www.interconti.com/croatia/zagreb/hotel_zagic.html | | 619 | 578 421 |
| Karlovak | 170 110 | http://www.kakarigi.net/manu/briefhis.htm | | 1457 | 78 154 |

-continued

| | | | | |
|---|---|---|---|---|
| Knin | 190 | http://www.kakarigi.net/manu/ | 1457 | 312 |
| | 110 | briefhis.htm | | 473 |
| Hotel Bellevue | 35 | http://www.kakarigi.net/manu/ | 1457 | 253 |
| | 155 | briefhis.htm | | 345 |
| Slunj | 145 | http://www.kakarigi.net/manu/ | 1457 | 92 |
| | 180 | briefhis.htm | | 202 |
| Plitvice | 170 | http://www.kakarigi.net/manu/ | 1457 | 128 |
| | 180 | briefhis.htm | | 247 |
| Udbina | 195 | http://www.kakarigi.net/manu/ | 1457 | 149 |
| | 180 | briefhis.htm | | 293 |
| Gracac | 215 | http://www.kakarigi.net/manu/ | 1457 | 206 |
| | 180 | briefhis.htm | | 331 |

For example, on page 16 of document 387 entitled "Travel Guide to the Balkans" edited by "*David Nash Ford, Web Atlas Association, Ltd.*", ISBN: 84-344-0856-2, the foil coordinates of the hyperlinked item "Slunj" on the document are X=145/Y=180. This hyperlinked word "Slunj" points to the electronic document at URL address: http://www.kakarigi.net/manu/briefhis.htm. This item also points to a point in this electronic document (where the place named "Slunj" is located) having a scroll coordinate Ys=1457 pixels and screen coordinates Xp=92, Yp=202 pixels.

The hyperlink table of the complete document is built using the herein described method for the different pages of a same document.

Method for Activating Hyperlinked Items

The user receives a hand written or printed document, like the document entitled "Travel Guide to the Balkans", (Doc: 387) shown in FIG. 6. This document comprises hyperlinks previously defined between items selected on the pages of this physical document and points (locations) on a digital map included in an electronic document. As shown in FIG. 11, the method of activating these hyperlinks for visualizing and highlighting the hyperlinked points (locations) on the digital map comprises the steps of:

(1101) selecting a physical document (by entering the reference number of this document);
(1102) selecting a page of this physical document;
(1103) placing and aligning the opto-touch foil over (or under) the selected page;
(1104) identifying the hyperlinked items defined on the selected page, identifying the position of these hyperlinked items on the opto-touch foil, and highlighting these hyperlinked items on the selected page by means of the opto-touch foil;
(1105) selecting an hyperlinked item on this page by pressing the opto-touch foil on the point (light spot) corresponding to the item;
(1106) identifying the electronic document associated with the selected hyperlinked item;
(1107) accessing, retrieving and displaying the electronic document associated with the selected hyperlinked item;
(1108) identifying scroll and screen coordinates of the hyperlinked point;
(1109) scrolling the electronic document to the identified scroll coordinate;
(1110) highlighting hyperlinked point on identified screen coordinates.

Selecting a Document Entering the Reference Number (1101)

The user selects a physical document (600) and, by means of any user interface (keyboard, mouse, touch screen, . . . ) or any reading means (bar code reader . . . ), enters the reference number or identifier (601), (e.g.: document 387) of the document. In the particular embodiment shown in FIG. 3, the user enters the reference number of the document (e.g.: Doc: 387) by means of an array of pressure sensible "touch buttons" (303) printed on the bottom of the opto-touch foil (300). The user presses in the following order:
  a touch button marked "Doc, and then
  numerical touch buttons corresponding to each digit of the document reference number (e.g., "3", "8" and "7").
This procedure gives access to the hyperlink table (407) associated with this selected document.

Selecting a Page (1102)

The user selects a page (701) of the physical document (700) and, by means of any user interface (keyboard, mouse, touch screen . . . ) or any reading means (bar code reader . . . ), the user enters the page number (or the portion of the document) (e.g.: page 16) of selected page. In the particular embodiment shown in FIG. 3, by means of the array of pressure sensible touch buttons (303) printed on the bottom of the opto-touch foil (300), the user enters the page number to select (e.g.: Pg. 16). The opto-touch foil (300) can be used in any position (normally the opto-touch foil is placed over the page comprising the hyperlink to activate). The user presses in the following order: a touch button marked as "Pg", and then numerical touch buttons corresponding to each digit of the page number (e.g., "1" and "6"),to select.

This step gives access to the selected page (e.g., Pg. 16) within the hyperlink table (407) associated with the selected document (e.g., Doc: 387), the hyperlink table comprising, for each hyperlinked item of each page of the document, the identification and position of the hyperlinked item.

Placing and Aligning an Opto-touch Foil (1103)

As shown also on FIG. 3, the opto-touch foil is placed over (or under) the page, and aligned with the borders of the selected page by some conventional means (e.g., by adjusting the upper left corner of the touch foil with the upper left corner of the page).

Highlighting Hyperlinks on the Selected Page (1104)

The position (coordinates X and Y) of all the hyperlinked items previously defined for the page selected by the user are retrieved from the hyperlink table (407) and sent by the user workstation (402) to the opto-touch foil (400). The opto-touch foil (400) receives the information sent by the user workstation (402). This information comprises the position (coordinates X and Y) of each hyperlinked item defined on the selected page. The opto-touch foil (400) decodes this information and visualizes (highlights or illumines) (405) the position of each of the hyperlinked items.

Once a document (601) and a page (701) have been selected, the opto-touch foil (400) generates one or a plurality of light spots (405) signaling that one or more hyperlinks have been defined for this page.

When the opto-touch foil (300) is placed and aligned over the selected page, the position of the light spots (304) emitted by the opto-touch foil corresponds to the position of the hyperlinked items (702) defined for this page. The hyperlinked items appear through the transparent opto-touch foil (300) and are identified by the user thanks to the light spots emitted by the opto-touch foil.

Selecting an Hyperlinked Item on this Page (1105)

As shown in FIG. 4, the user selects an hyperlinked item (406) ("Hotel Bellevue") on the page by pressing (e.g., by means of his fingertip) the opto-touch foil (400) on the (illuminated) point corresponding to the hyperlinked item.

By means of this action, the opto-touch foil (400) sends a signal to the user workstation (402) to identify the selected item. This signal indicates the position on the page of the point that has been pressed by the user on the opto-touch foil. The generated signal is generally proportional to the coordinates (X/Y) of the point that has been pressed. In our example, the opto-touch foil measures the position of the point that has been pressed on the page (near the light spot over the word "Hotel Bellevue") by the user. The coordinates measured at this point are around X=35 and Y=155.

The item that has been selected (406) on the opto-touch foil (400) by the user is then identified thanks to the hyperlink table (407). The hyperlink table comprises an indication of the position (coordinates X and Y) of each illuminated item on each page of the document. In our example, the coordinates measured by the opto-touch foil are around (close to) X=35 and Y=155. They corresponds, in the hyperlink table (407), to the hyperlinked item "Hotel Bellevue".

The hyperlink table is either stored locally in the user workstation (402), or is retrieved from a remote server (403) and then stored locally in the user workstation or is stored in a remote server and is accessed remotely.

Identifying the Electronic Document Associated with the Selected Item (1106)

The hyperlink table (407) comprises for each hyperlinked (illuminated) item (405) of each page of the physical document (401) means for locating within the user workstation or within the network, an associated electronic document. The electronic document can be located by means of a destination address. In the Internet network, Web pages in Web Servers (403) are identified by an URL (Uniform resource Locator).

In our example, the hyperlink table associates the illuminated item "Hotel Bellevue" with the URL: http://www.kakarigi.net/manu/briefhis.htm.

Accessing, Retrieving and Displaying the Associated Electronic Document (1107)

The user workstation (402) Web activates the hyperlink (destination address, URL, . . . ) associated in the hyperlink table (407), with the identified selected item (406).

The system searches in the hyperlink table (407), the coordinates of the hyperlinked item that is the nearest to the point pressed by the user. In our example, using the hyperlink table (407), for this page (i.e., Pg. 16), the hyperlink labeled "Hotel Bellevue" with the coordinates X=35, Y=155 is identified and activated. Thus, a simple pressure near the illuminated item "Hotel Bellevue" will automatically activate the following hyperlink on the Web: http://www.kakarigi.net/manu/briefhis.htm.

The Web Browser program (408) sends a HTTP request (410) to the identified Web Server (411). The reply to the request (HTTP response) (412) is sent by the Web Server (411) in the reverse direction, to the Web Browser (408). The HTTP reply comprises the requested Web page associated with the selected illuminated item (406). The electronic document (Web page) at the selected destination address (URL) is then retrieved through the Internet network (404) and is displayed by the Web browser (408) on the user workstation (402).

In our example, as illustrated in FIGS. 8 and 10, immediately after its retrieval by the user workstation, the Web page is automatically displayed by the Web browser starting from the beginning. Therefore, only the first portion (802) (1001) of the Web page is displayed on the screen of the user workstation.

Identifying Scroll and Screen Coordinates of the Hyperlinked Point (1108)

The user workstation (402) identifies the coordinates (i.e., scroll and screen pixel coordinates) (409) of the hyperlinked point associated, in the hyperlink table (407), with the identified selected item (406), the hyperlink table comprising for each hyperlinked item (405) referenced in the physical document (401), the coordinates (1005), (1006) of one or a plurality of hyperlinked points in the associated electronic document (1000);

In our example, the hyperlink labeled "Hotel Bellevue" has been activated on page 16 of the physical document. From the information contained in the hyperlink table (407), the system determines that:

Ys=1457 (pixels) is the scroll position coordinate (1005), and

Xp=253, Yp=345 (pixels) are the screen position (1006) coordinates of the hyperlinked point on the Web page retrieved from the URL address: http://www.kakarigi.net/manu/briefhis.htm.

Scrolling the Electronic Document to the Identified Scroll Coordinate (1109)

The user workstation (402) scrolls the electronic document to the scroll coordinate Ys previously identified to display on the screen, the area of the electronic document (e.g., the digital map (801)) comprising the point hyperlinked (1004) to the selected item (406).

The scrolling action performed In our example, by the user workstation is illustrated in FIG. 10. The Web page (1000), (800) retrieved from the URL address: http://www.kakarigi.net/manu/briefhis.htm.

is scrolled on the workstation screen, from an initial display window (1001) to a final display window (1002). At the final scroll position (1005) (Ys=1457 pixels), the digital map (1003) comprised in the hyperlinked document (1000) (where the hyperlinked point will be located) is displayed on the screen.

Highlighting Hyperlinked Point on Identified Screen Coordinates (1110)

The user workstation (402) positions a cursor or highlights by any other means (e.g., by a special symbol) the screen point corresponding to the identified screen coordinates (Xp, Yp).

In our example, as illustrated by FIG. 10, to highlight the hyperlinked point (i.e. the location of "Hotel Bellevue") on the Web page (1000), (800) retrieved from the URL address: http://www.kakarigi.net/manu/briefhis.htm, the point with screen coordinates Xp=253, Yp=345 (pixels) is signaled by means of a pointer (1004). FIG. 3 shows with more detail the relationship between the item selected by the user (305) on the physical document (301) and the position (location) (308) corresponding to this item on the displayed electronic document (306) associated with this selected item. Observe in FIG. 9 that the digital map included in the displayed Web page, do not references nor represents the location of "Hotel Bellevue".

Typical Applications

The present invention can be used in many applications. The differences between these applications are mainly due to the type of graphical information shown on the electronic documents and to the type of physical (i.e., hard-copy) document used to activate the hyperlinks.

Yellow Pages

In this particular application the user places an opto-touch foil over a page of the "Yellow Pages" of a city, (e.g., over a page with a list of "Restaurants" in the "Yellow Pages" of the city of Paris). The opto-touch foil is connected to an user workstation (e.g., to a WAP enabled cell phone or a PDA).

When the user presses the touch-foil on a printed item (e.g., the name of a restaurant), the geographic coordinates of this restaurant are retrieved from the Web and are highlighted over a digital map of the city of Paris displayed on the screen of the user workstation.

Installation and Engineering Instructions

The purpose of the present system is to help an technician to identify a part in a complete assembly, and to help him to see how this part interacts with the other parts.

A technician inspects a complex mechanical equipment, with an installation and service handbook comprising explanatory descriptions referencing parts and subassemblies represented on separate digital drawings and schemes. With an opto-touch foil placed on the installation and service handbook, the technician can immediately see items highlighted by luminous spots. These illuminated items are identified as hyperlinked items and can be used to access additional information on a remote Web server or on a local computer.

When the technician touches with a fingertip one of these illuminated items (e.g., the name of a part), multimedia instructions are instantly displayed on the screen of his workstation to help him to install the part. At the same time the location of the part appears pointed on an auxiliary digital drawing or scheme on the same screen.

There is no need to reference the different parts on the printed handbook or on the drawings by means of specific names, numerals or pointers (as is the common practice with engineering documentation). The technician has just to press with his finger on the item illuminated on the installation handbook to see automatically illuminated the position of this item over a digital graphical representation of the equipment to install or to repair. Therefore, by means of the present invention, hard-copy technical documents are less complex, clearer and easier to use. Handbooks and drawings don't need any more to be populated with cumbersome alphabetic and numeric cross references.

Courses and Textbooks

Extensive reading is easier to do on paper, but digital graphics illustrations are much more effective for some particular purposes. The two can be tied together by placing hyperlinked items in a textbook. These hyperlinked items can provide optical pointers to items on electronic figures, diagrams or schemes retrieved through the Web.

Clinical and Medical Applications

For example, as illustrated on FIG. 12, it should be possible to highlight on digital images of human anatomy (e.g., on a Computerized Tomography (CT) Scan), the location of organs or pathologies cited in the case history of a patient.

Being apparent that, apart from the herein described applications, there are many other possible applications of this invention, what has been described is merely illustrative of the application of the principles of the present invention. Other arrangements and methods can be implemented by those skilled in the art without departing from the spirit and the scope of the present invention.

What is claimed is:

1. A method of creating hyperlinks from hyperlinked items referenced in a physical document to an electronic document, the method comprising:
   (a) creating a hyperlink table for the physical document, the physical document having at least one page;
   (b) for each page of the physical document, storing in the hyperlink table means for identifying a page and means for identifying at least one hyperlinked item defined on the page;
   (c) determining the position of points pressed on an opto-touch foil aligned with the page of the physical document; the points corresponding to the positions of the hyperlinked items;
   (d) storing in the hyperlink table the position of the points pressed, the hyperlink table comprising for each hyperlinked item, an indication of a position on the page; and
   (e) for each hyperlinked item defined on the page:
      (i) associating an electronic document;
      (ii) storing in the hyperlink table data identifying and locating the electronic document;
      (iii) associating one or a plurality of hyperlinked points located on the electronic document; and
      (iv) storing in the hyperlink table the position of each hyperlinked point on the electronic document.

2. The method according to claim 1, wherein (a) comprises:
   (a1) storing in the hyperlink table an identification of the physical document.

3. The method of claim 1 wherein (d) comprises:
   (d1) storing in the hyperlink table the pixel coordinates of each hyperlinked point.

4. The method according to claim 3 wherein the pixel coordinates comprise:
   a scroll coordinate for selecting and displaying a portion of the electronic document, the displayed portion comprising the hyperlinked point; screen coordinates for positioning the hyperlinked point on the displayed portion of the electronic document.

5. The method according to claim 1, wherein a user system is connected to a communication network comprising at least one server, and wherein the electronic documents associated with the hyperlinked items are located on the at least one server.

6. The method according to claim 1 wherein (b) comprises:
   (b1) storing a destination address in a communication network where the electronic document associated with the hyperlinked item can be accessed.

7. The method according to claim 1 wherein the electronic documents associated with the hyperlinked items are located in the user system.

8. The method according to claim 1 wherein the electronic documents are digital maps and the hyperlinked points are geographic locations represented on the digital maps.

9. The method according claim 5 wherein the communication network is an Internet Protocol (IP) network.

10. The method according claim 5 wherein the user system comprises a Web browser and the server comprises a Web server.

11. The method according claim 5 wherein the destination address comprises a Uniform Resource Locator (URL address) and the electronic documents comprise Web pages.

12. The method according to claim 1 wherein the opto-touch foil is aligned with a page of a physical document and further comprising a connection between the opto-touch-foil and the user system.

13. A method for activating hyperlinks from one or a plurality of items referenced in a physical document to one or a plurality of points in electronic documents, the method comprising:
- (a) identifying a physical document;
- (b) identifying a page in the physical document;
- (c) determining the position of a point pressed on an opto-touch foil placed and aligned over or under the identified page, the opto-touch foil being pressed at a point corresponding to a selected hyperlinked item;
- (d) identifying the selected hyperlinked item by referring to a hyperlink table associated with the physical document, the hyperlink table comprising an indication of the position on the identified page of the physical document of each referenced hyperlinked item;
- (e) identifying and locating the electronic document associated with the selected hyperlinked item referring to the hyperlink table, the hyperlink table comprising for each hyperlinked item of each page of the document the identification and location of the electronic document associated with the hyperlinked item;
- (f) accessing and displaying the electronic document associated with the selected hyperlinked item;
- (g) identifying the position on the electronic document of each point hyperlinked with the selected hyperlinked item referring to the hyperlink table, the hyperlink table comprising for each hyperlinked item referenced in the physical document, the position of one or a plurality of points on the electronic document; and
- (h) designating the position on the displayed electronic document, of each point hyperlinked with the selected item.

14. The method according to claim 13, further comprising:
- (i) sending, to the opto-touch foil, the position of the hyperlinked items referenced in the identified page for visualizing the hyperlinked items on the physical document.

15. The method according to claims 13, wherein the user system is connected to a communication network comprising at least one server, and wherein the electronic documents associated with the hyperlinked items are located on the at least one server.

16. The method according to claim 15, wherein (e), comprises:
- (e1) identifying a destination address in a communication network where the electronic document associated with the hyperlinked item can be accessed.

17. The method according to claim 13 wherein the electronic documents associated with the hyperlinked items are located on the user system.

18. The method according to claim 13, wherein (e) the step of identifying the position on the electronic document of each point hyperlinked with the selected hyperlinked item referring to the hyperlink table, comprises:
- (e1) identifying the pixel coordinates of each point hyperlinked with the selected hyperlinked item, referring to the hyperlink table.

19. The method of claim 18 wherein the pixel coordinates comprise:
- a scroll coordinate for selecting and displaying a portion of the electronic document, the displayed portion comprising the hyperlinked point;
- screen coordinates for positioning the hyperlinked point on the displayed portion of the electronic document.

20. The method according to claim 13, wherein the electronic documents are digital maps and the hyperlinked points are the geographic locations on the digital maps.

21. The method according to any one of claim 13 wherein the communication network is an Internet Protocol (IP) network and wherein:
- the user system comprises a Web browser;
- the destination comprises a Uniform Resource Locator (URL address);
- the electronic documents comprise Web pages.

22. The method according to claim 21 wherein the opto-touch foil is aligned with a page of a physical document and further comprising a connection between the opto-touch-foil and the user system.

23. A computer program product for use with a computer system capable of creating hyperlinks from hyperlinked items referenced in a physical document to an electronic document, the computer program product comprising a computer readable medium having embodied therein program code comprising:
- (a) program code for creating a hyperlink table for the physical document, the physical document having at least one page;
- (b) for each page of the physical document, program code for storing in the hyperlink table means for identifying a page and means for identifying at least one hyperlinked item defined on the page;
- (c) program code for determining the position of points pressed on an opto-touch foil aligned with the page of the physical document; the points corresponding to the positions of the hyperlinked items;
- (d) program code for storing in the hyperlink table the position of the points pressed, the hyperlink table comprising for each hyperlinked item, an indication of a position on the page; and
- (e) for each hyperlinked item defined on the page, program code for:
  - (i) associating an electronic document;
  - (ii) storing in the hyperlink table data identifying and locating the electronic document;
  - (iii) associating one or a plurality of hyperlinked points located on the electronic document; and
  - (iv) storing in the hyperlink table the position of each hyperlinked point on the electronic document.

24. A computer program product for use with a computer system capable of activating hyperlinks from one or a plurality of items referenced in a physical document to one or a plurality of points in electronic documents, the computer program product comprising a computer readable medium having embodied therein program code comprising:

(a) program code for identifying a physical document;
(b) program code for identifying a page in the physical document;
(c) program code for determining the position of a point pressed on an opto-touch foil placed and aligned over or under the identified page, the opto-touch foil being pressed at a point corresponding to a selected hyperlinked item;
(d) program code for identifying the selected hyperlinked item by referring to a hyperlink table associated with the physical document, the hyperlink table comprising an indication of the position on the identified page of the physical document of each referenced hyperlinked item;
(e) program code for identifying and locating the electronic document associated with the selected hyperlinked item referring to the hyperlink table, the hyperlink table comprising for each hyperlinked item of each page of the document the identification and location of the electronic document associated with the hyperlinked item;
(f) program code for accessing and displaying the electronic document associated with the selected hyperlinked item;
(g) program code for identifying the position on the electronic document of each point hyperlinked with the selected hyperlinked item referring to the hyperlink table, the hyperlink table comprising for each hyperlinked item referenced in the physical document, the position of one or a plurality of points on the electronic document; and
(h) program code for designating the position on the displayed electronic document, of each point hyperlinked with the selected item.

* * * * *